__United States Patent Office__

3,409,605
Patented Nov. 5, 1968

3,409,605
CONCENTRATION AND PURIFICATION OF GROWTH FACTOR - PLACENTAL ORIGIN (HUMAN)
James Ralph Florini, Pearl River, N.Y., assignor to American Cyanamid Company, Stamford, Conn., a corporation of Maine
No Drawing. Filed June 15, 1965, Ser. No. 464,237
9 Claims. (Cl. 260—112)

ABSTRACT OF THE DISCLOSURE

An improved method for obtaining and purifying a growth factor of human placental origin is described. A method of treating the growth factor so-obtained to inactivate any hepatitis virus which may be present is also described resulting in a product which can safely be used for injection into humans.

---

This invention relates to an improved method of recovering a growth factor of placental origin from humans, which throughout the remainder of the specification will be abbreviated GF–PO(H), and to a method of treating the GF–PO(H) to kill any hepatitis virus which may be present. While either modification of the invention may be used alone, they are preferably used together for producing a product which can safely be used for treatment of human beings.

In recent years a substance has been recovered from human placenta as described, for example, by Josimovich and MacLaren in volume 71, Endocrinology, beginning at page 209, and Kaplan and Grumbach in volume 24, J. Clin. Endocrinology, beginning at page 80. I have found this material to have growth promoting activity. The presence of this substance has also been confirmed by other workers, and various names have been given to it, such as "growth hormone-prolactin" and the like. However, the designation GF–PO(H) is used in the present specification as being more directly identifying.

The GF–PO(H) is a protein of medium size from 30,000 to 50,000 molecular weight. It is immunologically very closely related to the human growth hormone (HGH) which is secreted by the human pituitary gland or hypophysis. The GF–PO(H) however, although closely related, is not identical to the pituitary hormone. The molecular weight is about the same and the amino acid analysis is quite similar, the GF–PO(H) showing larger amounts of aspartate, methionine, and histidine, and slightly less proline and amide nitrogen. It is not known what the exact locations of the amino acids are in the present material.

Determination of the amount of GF–PO(H) protein in processing, for example by chromatography or analogous processes, is often accomplished by observation of ultra-violet absorbance at 280 m$\mu$ (some workers have used 278 m$\mu$). The physiological effects of GF–PO(H) are normally quantitatively determined in standard laboratory animals by measuring body weight gain in immature hypophysectomized rats, mobilization of fatty acids, or stimulation of lactation in pseudopregnant rats and rabbits.

As has been pointed out above, various methods have been used to separate the GF–PO(H) from human placental tissue, for example column chromatography on Amberlite IRC–50 resin followed by precipitation with 20% ethanol by volume. This is described in the Josimovich and MacLaren article mentioned above. Other chromatographic processes on diethylaminoethylcellulose columns are described by Cohen, Grumbach and Kaplan, in an article subsequent to the development of the present invention (Proceedings of the Society for Experimental Biology and Medicine, volume 117, beginning on page 438). As raw material for the present invention, it is preferred to use fraction III$_1$, described in the article by Cohen et al. in the Journal of the American Chemical Society, volume 68, pages 459 ff. It should be noted that the present invention is not limited to using this particular preferred raw material, and other fractions derived from human placental tissue may be used.

Essentially, the present invention is directed to improved processes of obtaining and purifying GF–PO(H). Adsorption on diethylaminoethyl-cellulose (which will be referred to in the remainder of the specification as DEAE-cellulose), is used either batch-wise or on a column. The batch process is much simpler, can be carried out more rapidly, and produces an excellent product. In general, fraction III$_1$ is dispersed in a dilute solution of a salt, preferably ammonium bicarbonate at a pH above the isoelectric point of the GF–PO(H). This solution is then adsorbed on DEAE-cellulose, which is washed free of entrapped solution, and then the GF–PO(H) is displaced by eluating with a stronger aqueous salt solution. To retard or inhibit loss of growth-factor activity the above procedures are preferably carried out in a room having a temperature of about 4° C. The eluate is then lyophilized to produce the desired product in the form of a white powder.

It is an advantage of the present invention that yield and purity can be traded off against each other to a degree, depending on the purity of the product which is needed. This is effected by varying the DEAE-protein ratio and is particularly applicable to batch processes, which are preferred. This flexibility is a practical operating advantage of the present invention. The ionic strength of the salt in the original and washing solution should be maintained below 0.05$\mu$, but on the other hand, the eluting solution should preferably have a higher ionic concentration. The salts used may advantageously exert a buffering effect to maintain the pH in the proper range. For this purpose bicarbonates and phosphates are useful, and they may be salts of sodium, potassium or ammonium; but the convenience of using ammonium bicarbonate, which is volatile and removed in the freeze-drying step of the process, renders it the preferred salt to use.

When the GF–PO(H) is to be used in humans, it is necessary to destroy any hepatitis virus which may be present; this procedure constitutes the second modification of the present invention. Conditions for destroying hepatitis virus have been established by the National Institute of Health as heating at 60° C. for 10 hours. Heating has often been found to degrade proteins, particularly those of high molecular weight. It has been found, however, that GF–PO(H) appears to be fairly resistant to degradation by heating to kill the hepatitis virus and so this killing of the virus by heat is included in the present invention. Although it is preferred to use the 60° C. temperature for 10 hours, both because it is effective and because at present it is sanctioned by the NIH, the invention is not strictly limited to a temperature of approximately 60° C. and includes temperatures from about 50° C. to about 90° C. Heating time will vary with the temperature, longer times being necessary with the lower temperatures; therefore, the wider range of temperature is included within the broader scope of the present invention. Times can only be specified functionally as the particular time needed varies with temperature. Of course the heating time must be sufficiently long to kill the hepatitis virus. In a more specific aspect, the preferred time and temperature is about 60° C. for 10 hours, as this is proven to be satisfactory and, as will appear below, does not result in excessive loss of biological activity of the GF–PO(H).

The heating operation proceeds in dilute aqueous dispersion of the GF–PO(H), and it has been found that the presence of dissolved materials, which act as buffers, are advantageous. This is the preferred procedure although the invention is not limited in its broader aspects thereto. Typical dissolved materials are ammonium bicarbonate, ammonium acetate, glycylglycine hydrochloride, alkali metal carbonates, and the like. If desired, from 0.5% to 5% of a polyhydric alcohol such as sorbitol may be present.

After the heating has proceeded for sufficient time to kill the hepatitis virus, which in the preferred modification is 10 hours at 60° C., the material is then cooled to room temperature, the pH adjusted to 8.0, preferably with ammonium hydroxide; and after sterile filtration, the filtrate is freeze dried in the conventional manner to produce a solid product. It is an advantage of the present invention that the exact temperature and exact time are not sharply critical, but they should be kept as low as possible while still killing the virus. The pH of the heating itself should range between 3.0 and 8.0 but is not sharply critical.

Surprisingly, the heating does not seriously reduce the activity of the growth factor, although it cannot be said that there never is any change. In general, where there is a small change this is probably due, at least in part, to forming some larger protein molecules which appear to have lower biological activity.

The invention will be described in greater detail in conjunction with the following examples which are typical, the parts being by weight unless otherwise specificed.

EXAMPLE 1

Approximately 1000 grams of frozen paste of placental fraction $III_1$ was dissolved, by mechanical stirring overnight, in 10 liters of 0.05 M $NH_4HCO_3$ adjusted to pH 8.0. The solution was filtered to remove any undissolved material. The concentration of total protein in the solution was estimated by reading the absorbance of the solution at 280 m$\mu$ on a spectrophotometer, and then multiplying the absorbance by the number of milliliters of solution. The total number of absorbancy units present was $8.5 \times 10^5$.

A suitable quantity of DEAE-cellulose was prepared for use in the process by treating it with 1 N NaOH followed by exhaustive washing with distilled water. When the pH of the washings was below 8.0, the DEAE-cellulose was collected by vacuum filtration. About 212 grams of DEAE-cellulose was added to the solution, e.g., a ratio of about 0.25 mg. of wet DEAE-cellulose per absorbancy unit of fraction $III_1$ solution. The mixture was stirred for one hour and allowed to settle. The liquid portion was removed by decantation followed by filtration, and then discarded. The DEAE-cellulose was washed repeatedly with 0.05 M $NH_4HCO_3$ at pH 8.0 by resuspending the DEAE-cellulose and filtering until the filtrate was colorless.

About 750 ml. of 0.5 M $NH_4HCO_3$, pH 8, was then added to the DEAE-cellulose and the mixture was stirred for one hour. The eluate was removed by filtration and another 750 ml. portion of 0.5 M $NH_4HCO_3$ was added to the DEAE-cellulose and the elution process was repeated as before. The two eluates were combined and the volume and absorbance at 280 m$\mu$ of the combined eluates was determined. Lyophilization of the combined eluates yielded a fine white powder, the desired GF–PO(H). All of the above procedure was carried out in a cold room having a temperature of 4° C. Tabulated results of the procedure are listed in Table I.

TABLE I

| Sample | $A_{280 m\mu}$ | Volume (ml.) | Total Absorbancy Units | GF–PO(H) Content, percent |
|---|---|---|---|---|
| Fraction $III_1$ | 85.0 | 10,000 | $8.5 \times 10^5$ | 5–10 |
| DEAE eluate | 9.6 | 1,500 | $1.45 \times 10^4$ | 60–80 |

The precentage of GF–PO(H) was determined by immuno-diffusion assay against antiserum to human growth hormone by the procedure of Morris et al., J. Clin. Endoc. 24, 417 (1964).

EXAMPLE 2

A procedure generally as in Example 1 was followed using different amounts of material and varying the concentrations of solutions.

About 250 g. of frozen fraction $III_1$ paste was dissolved in 0.01 M $NH_4HCO_3$, at pH 8.0. The solution was measured to contain $2.01 \times 10^5$ absorbancy units. About 402 g. of DEAE-cellulose was added to the solution (2.0 mg. of DEAE-cellulose/absorbancy unit). After absorption of the GF–PO(H) onto the DEAE-cellulose, the resin was washed with 0.01 M $NH_4HCO_3$ at pH 8.0, and the GF–PO(H) was eluted with two 800 ml. portions of 0.5 M $NH_4HCO_3$, at pH 8.0. The eluates were combined and then lyophilized to yield a fluffy brownish-white powder. Results of this procedure are given in Table II.

TABLE II

| Sample | $A_{280 m\mu}$ | Volume (ml.) | Total Absorbancy Units | GF–PO(H) Content, percent |
|---|---|---|---|---|
| Fraction $III_1$ solution | 20.1 | 10,000 | $2.01 \times 10^5$ | 5–10 |
| DEAE supernatant | 16.6 | 10,000 | $1.66 \times 10^5$ | 1–2 |
| DEAE eluates | 11.9 | 1,690 | $2.01 \times 10^4$ | 30–40 |

It will be noted that in Example 1 a high purity GF–PO(H) was produced but the yield was not as high as in Example 2, where the product was not quite as pure, being slightly brownish. The ability to choose the best compromise between yield and purity is an important practical operating advantage of the present invention.

EXAMPLE 3

Results of GF–PO(H) in promoting growth in rats

Injectable solution of GF–PO(H) were prepared by dissolving suitable amounts of GF–PO(H), prepared as in Example 1, in saline so that the injection volume was 0.2 ml. in all cases. Varying doses were given to immature hypophysectomized rats (70–90 g. initial weight) for varying periods of time. A subcutaneous route of administration was used. Results of this study are given in Table III.

TABLE III

| Treatment | Dose, mg./day | No. of Rats | Increase in Body Weight (g./rat Plus or Minus S.E.) | | |
|---|---|---|---|---|---|
| | | | 7 days | 16 days | 21 days |
| Saline (control) | | 10 | 5.5±0.7 | 7.9±1.2 | 10.4±1.4 |
| GF–PO(H) | 4.0 | 6 | 7.7±1.9 | 13.5±2.5 | 17.0±3.7 |
| GF–PO(H) | 8.0 | 6 | 10.2±1.8 | 15.2±1.9 | 18.7±3.7 |
| GF–PO(H) | 16.0 | 5 | 10.2±1.0 | 23.0±2.2 | 26.8±2.0 |

Standard error in the measurements is abbreviated, as customary, S. E.

EXAMPLE 4

To each of a series of ten screw-cap test tubes was added one ml. of an aqueous solution, concentration 50 mg./ml. of GF–PO(H). One ml. of the following solutions, as shown in Table IV, calculated to give the final concentrations specified there, is added as follows: one ml. of water to tube one, one ml. of solution No. 2 to tube two, one ml. of solution No. 3 to tube three and so on until tube ten is reached. The tubes are then placed in a 60° C. water bath and allowed to remain for 10 hours. At the end of this period, 8 ml. of 0.05 M NH₄HCO₃ is added to each tube. The activity of GF-PO(H) of each solution is determined by the microimmuno diffusion assay and starch gel electrophoresis. Results using these procedures are given in Table IV.

It will also be noted that there has been no loss in activity as compared with the unheated control, and the growth in markedly greater, approximately double that of test 8, which showed the growth of rats which had received no GF-PO(H).

TABLE IV

| Sample Tubes and Conditions | Microimmuno Diffusion Assay, Percent of Control | Starch-Gel Assay |
|---|---|---|
| 1. Sample Only, Not Heated, Control | | |
| 2. 0.025 M NH₄HCO₃, pH 8 | 67 | Similar to control. |
| 3. 0.025 M NH₄HCO₃, 5% sorbitol, pH 8 | 100 | Do. |
| 4. 0.025 M NH₄HCO₃, 0.5% sorbitol, pH 8 | 100 | Do. |
| 5. 0.025 M NH₄HCO₃, 5% glycerol, pH 8 | 100 | Do. |
| 6. 0.025 M NH₄HCO₃, 0.5% glycerol, pH 8 | 100 | Do. |
| 7. 0.025 M Glycylglycine·HCl, 5% sorbitol, pH 3 | 100 | Do. |
| 8. 0.025 M Glycylglycine·HCl, pH 3 | 100 | Do. |
| 9. 0.025 M NH₄HCO₃, 1% acetyltryptophan, pH 8 | 67 | Do. |
| 10. 0.025 M NH₄HCO₃, 1% sodium caprylate, pH 8 | 67 | Do. |

It will be noted that, within the precision of the assays used, in many cases there appeared no loss of GF-PO(H) and even in the tubes 2, 9 and 10, there is still a large portion of the content remaining. Because of the higher activity and greater convenience, the ammonium bicarbonate-sorbitol method is normally preferred.

EXAMPLE 5

Four grams of Growth Factor is suspended in 40 ml. of each of the following solutions:

(1) 0.05 M NH₄HCO₃, pH 8.
(2) 0.05 M glycylglycine·HCl, pH 3.
(3) 0.05 M ammonium acetate, pH 5.
(4) 0.05 M NH₄HCO₃, plus 0.2 gram sorbitol, pH 8.
(5) 0.05 M glycylglycine·HCl, plus 0.2 gram sorbitol, pH 3.
(6) 0.05 M glycylglycine·HCl, plus 2.0 gram sorbitol, pH 3.

The suspensions are placed in a water bath at 60° C. for 10 hours. At the end of this period, the pH of each sample is adjusted to pH 8.0 with NH₄OH and 40 ml. of NH₄HCO₃, pH 8.0, is added to achieve complete solution of all samples.

Water and NH₄HCO₃ is removed by drying from the frozen state at low pressures. The residues are then redissolved in 0.9% saline, pH 8.0, to give a final concentration of 80 mg. solids per ml. (Sample No. 6 was redissolved at a concentration of 120 mg. solids per ml. to allow for the relatively high concentration of sorbitol in the preparation.) The GF-PO(H) activity of each solution is determined by four methods:

(a) Ultra violet light absorption at 280 mµ,
(b) Quantitative immuno-diffusion assay,
(c) Electrophoresis in a starch gel,
(d) Growth stimulation in immature hypophysectomized male rats.

Sample No. 7 is used as a control and consists of untreated starting material. Results of these determinations are listed in the following table.

EXAMPLE 6

A solution of 1.5 g. of sorbitol in about 150 ml. of water at 60° C. was prepared, to which was added 3.0 g. GF-PO(H) and about 200 mg. of sodium bicarbonate. The solution was heated at 60° C. for 10 hours, cooled and stored in an ice bath overnight. One half of the solution was used to determined the amount of DEAE-cellulose required for optimal recovery of GF-PO(H); a ratio 6 mg. DEAE-cellulose per O.D.₂₈₀ absorbancy unit of protein was found to give satisfactory results. About 9.0 g. of DEAE-cellulose was then added to 75 ml. of the heated GF-PO(H) solution and the mixture was stirred about 30 minutes at 4° C. After the suspension was allowed to settle, the supernatant liquid was removed by aspiration and filtration and discarded. The DEAE-cellulose was washed exhaustively with 0.05 M NH₄HCO₃, pH 8.0, until the O.D.₂₈₀ of the washings was less than 0.10. The GF-PO(H) was eluted from the DEAE-cellulose with about 70 ml. of 0.5 M NH₄HCO₃, pH 8.0, in two aliquots of about 35 ml. each. The eluates were combined and lyophilized to dryness. Results are given in Table VI, below.

TABLE VI

| Fraction | O.D.₂₈₀ | Vol. (ml.) | Total O.D. Units | Percent in GF-PO(H) Peak |
|---|---|---|---|---|
| Unheated GF-PO(H) | 16.5 | 75 | 1.24×10³ | 81.4 |
| Heated GF-PO(H) | 16.3 | 75 | 1.22×10³ | 45.0 |
| DEAE-Cellulose Treated | 6.17 | 64 | 3.95×10² | 74.8 |

EXAMPLE 7

The previous indications that aggregation occurs during heating led to an investigation of the effect of protein concentration during heating on the amount of aggregation. A solution of 200 mg./ml. GF-PO(H) in H₂O was diluted to give the concentrations indicated below. The solutions were heated at 60° C. for 15 hours, cooled rapidly to 4° C., and analyzed by gel filtration on Sephadex

| Sample | Heating Condition | UV abs., 280 mµ | Immuno diffusion, mg. GF-PO(H)/ml. | Starch gel electrophoresis | Change in body weight, grams/rat in 21 days plus S.E. |
|---|---|---|---|---|---|
| 1 | pH 8 | 0.805 | 380–600 | Slightly less GF-PO(H) Than Control | 17.3±1.4 |
| 2 | pH 3 | 0.761 | 380–600 | do | 21.3±1.8 |
| 3 | pH 5 | 0.550 | 480–720 | do | 22.0±1.9 |
| 4 | pH 8, 0.5% Sorb | 0.740 | 480–720 | Similar to Control | 22.9±4.1 |
| 5 | pH 3, 0.5% Sorb | 0.850 | 380–600 | do | 21.0±2.5 |
| 6 | pH 3, 5.0% Sorb | 0.761 | 480–720 | do | 28.7±2.7 |
| 7 | (Unheated) | 0.750 | 480–720 | do | 19.1±1.8 |
| 8 | Saline-injected hypophysectomized rats | | | | 9.9±2.6 |

Note.—Rats were administered a 16 mg./day subcutaneous dose of GF-PO(H) for 21 days.

G-100 dextran. Areas under the various peaks were measured with a planimeter.

Results obtained are given in Table VII.

TABLE VII

| Protein conc. (mg./ml.): | Percent in GF–PO(H) Peak after heating |
|---|---|
| 20 | 54 |
| 15 | 59 |
| 10 | 66 |
| 5 | 79 |
| not heated | 81 |

It will be noted that less loss in GF-PO(H) was obtained when the heating was in more diluted concentration. Results are still good even with some increase in concentration but for best results the more dilute solutions, such as 5 mg./ml. are to be preferred.

I claim:

1. A process for concentration and purification of Growth Factor-Placental Origin (Human) which comprises dispersing a placental fraction containing it in a dilute aqueous ammonium bicarbonate solution the ionic strength of which does not substantially exceed $0.05\mu$, adjusting the pH to a point above the isoelectric point of the GF–PO(H), filtering off undissolved material, adsorbing the GF-PO(H) on diethylaminoethyl-cellulose, washing the DEAE-cellulose with a dilute aqueous ammonium bicarbonate solution, eluting with an aqueous ammonium bicarbonate solution of ionic strength above $0.05\mu$, and recovering the protein from the eluate.

2. A process according to claim 1 in which the ammonium bicarbonate concentration of the eluting solution is approximately an order of magnitude greater than that of the soltuion which is adsorbed.

3. A process according to claim 1 in which the temperature is maintained at 4° C.

4. A process according to claim 2 in which the temperature is maintained at 4° C.

5. A process of producing a purified product comprising Growth Factor-Placental Origin (Human) free from hepatitis virus which comprises heating a dilute aqueous dispersion of the product obtained by the process of claim 1 to a temperature from about 50° C. to about 90° C. for a time sufficient to kill hepatitis virus, the temperature being below that at which extensive degradation of biological activity of the Growth Factor takes place, and recovering the product.

6. A process according to claim 5 in which the temperature is approximately 60° C.

7. A process according to claim 5 in which the heating takes place in the presence of a buffering salt.

8. A process according to claim 7 in which the buffering salt is ammonium bicarbonate.

9. A process according to claim 8 in which from approximately 0.5% to approximately 5% of a polyhydric alcohol is present.

References Cited

UNITED STATES PATENTS 2,923,665  2/1960  Hagan et al. ---------- 195—66

OTHER REFERENCES

Endocrinology, vol. 71, 1962, pp. 209–220, Josimovich et al.

Society For Experimental Biology and Medicine, vol. 117, July 7, 1964, Cohen et al., pp. 438–441.

Science, vol. 147, pp. 751–753, Dec. 17, 1964, Kaplan.

Endocrinology, vol. 76, Friesen et al., pp. 369–381, date relied on—July 1, 1964.

WILLIAM H. SHORT, *Primary Examiner.*

H. SCHAIN, *Assistant Examiner.*